US010274639B2

(12) United States Patent
Gelman et al.

(10) Patent No.: US 10,274,639 B2
(45) Date of Patent: Apr. 30, 2019

(54) REAL-TIME ELECTROMAGNETIC TELEMETRY SYSTEM

(71) Applicant: Schlumberger Technology Corporation, Sugar Land, TX (US)

(72) Inventors: Andriy Gelman, Somerville, MA (US); Julius Kusuma, Alrington, MA (US); Luis Eduardo DePavia, Sugar Land, TX (US); Arnaud Croux, Boston, MA (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/620,703

(22) Filed: Jun. 12, 2017

(65) Prior Publication Data

US 2018/0003043 A1   Jan. 4, 2018

Related U.S. Application Data

(60) Provisional application No. 62/357,073, filed on Jun. 30, 2016.

(51) Int. Cl.
| G01V 3/00 | (2006.01) |
| G01V 11/00 | (2006.01) |
| E21B 47/12 | (2012.01) |

(52) U.S. Cl.
CPC .......... *G01V 11/002* (2013.01); *E21B 47/121* (2013.01)

(58) Field of Classification Search
CPC ........ E21B 47/122; E21B 49/00; E21B 47/12; E21B 47/0002; G01R 29/26; H04B 15/00; G01V 11/002; G01V 1/46; G01V 11/00

USPC .............. 340/853.1; 702/9; 348/85; 382/248
See application file for complete search history.

(56) References Cited

U.S. PATENT DOCUMENTS

| 8,400,326 | B2 | 3/2013 | Codazzi | |
| 9,951,607 | B2 * | 4/2018 | Wessling | ................ E21B 47/06 |
| 2014/0277752 | A1 * | 9/2014 | Chang | ..................... E21B 44/00 |
| | | | | 700/275 |
| 2015/0109140 | A1 | 4/2015 | Probel et al. | |
| 2015/0381981 | A1 | 12/2015 | Gelman et al. | |
| 2016/0061027 | A1 | 3/2016 | Gao et al. | |
| 2016/0108724 | A1 | 4/2016 | Jarrot | |
| 2017/0122099 | A1 * | 5/2017 | Yao | ....................... E21B 49/003 |
| 2018/0003042 | A1 | 1/2018 | DePavia et al. | |

(Continued)

OTHER PUBLICATIONS

Taubman, "High performance scalable image compression with EBCOT," IEEE Transactions on Image Processing, vol. 9, No. 7, Jul. 2000, pp. 1158-1170.

(Continued)

*Primary Examiner* — Toan N Pham

(57) ABSTRACT

A method for improving a quality of data received from a downhole tool in a wellbore includes receiving a first block of data from a downhole tool in a wellbore. The first block of data represents a first measurement captured by the downhole tool during a first period of time. At least a portion of a bit budget for a second block of data is allocated to the first block of data to produce an updated first block of data. The method also includes receiving the second block of data from the downhole tool in the wellbore. The second block of data represents a second measurement captured by the downhole tool during a second period of time.

15 Claims, 15 Drawing Sheets

(56) References Cited

U.S. PATENT DOCUMENTS

2018/0003044 A1    1/2018    Kusuma et al.
2018/0003527 A1    1/2018    Jarrot et al.
2018/0003849 A1    1/2018    Chung et al.

OTHER PUBLICATIONS

Marcellin, et al. "An overview of JPEG-2000," IEEE Data Compression Conference, 2000. Proceedings. DCC 2000, Snowbird, UT, 2000, pp. 523-541.

Duda, et al., "Use of the Hough transformation to detect lines and curves in pictures," Communications of the ACM, vol. 15, No. 1, Jan. 1972, pp. 11-15.

Ortega, et al., "Rate-distortion methods for image and video compression," IEEE Signal Processing Magazine, vol. 15, No. 6, Nov. 1998, pp. 23-50.

\* cited by examiner

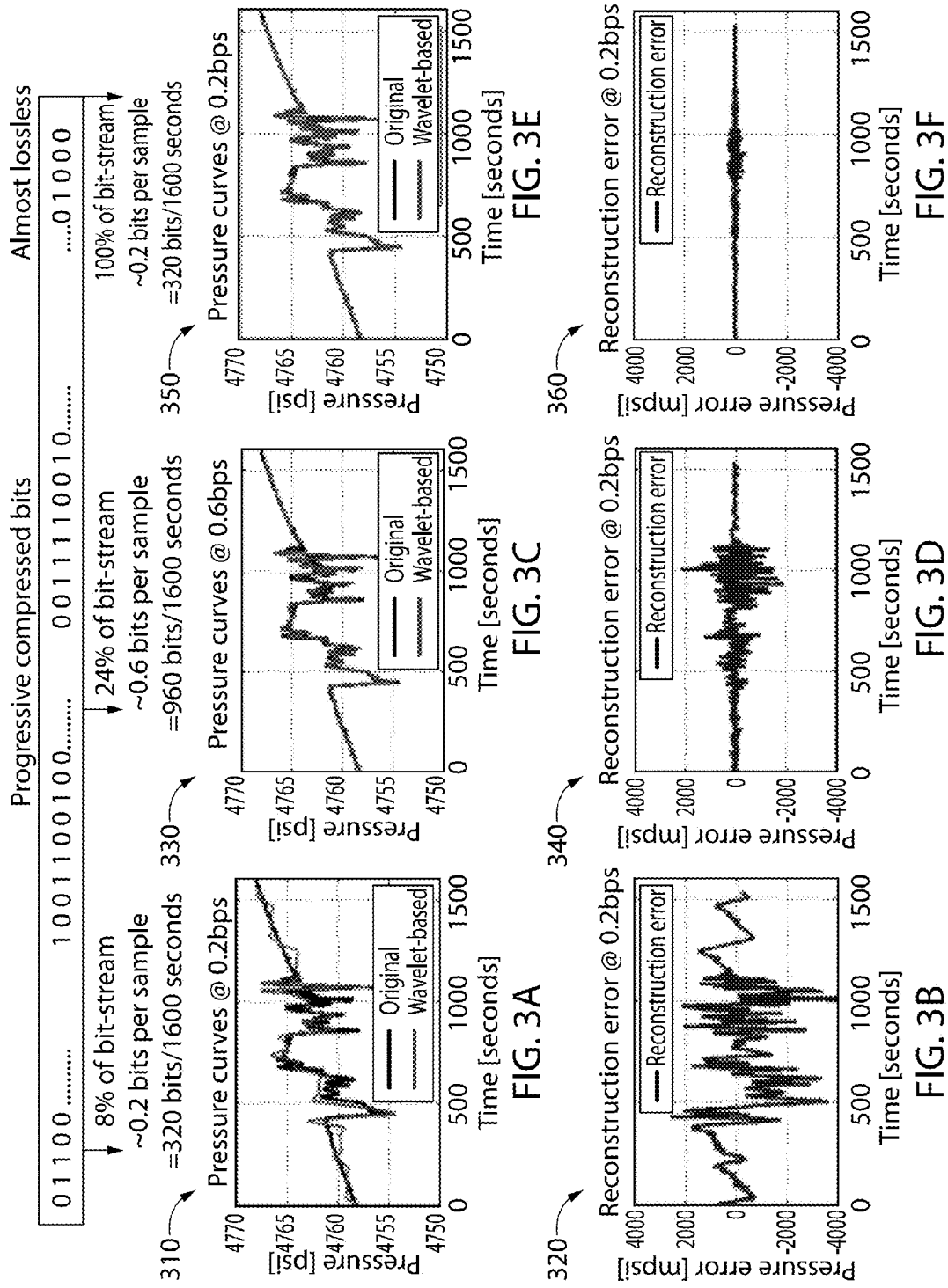

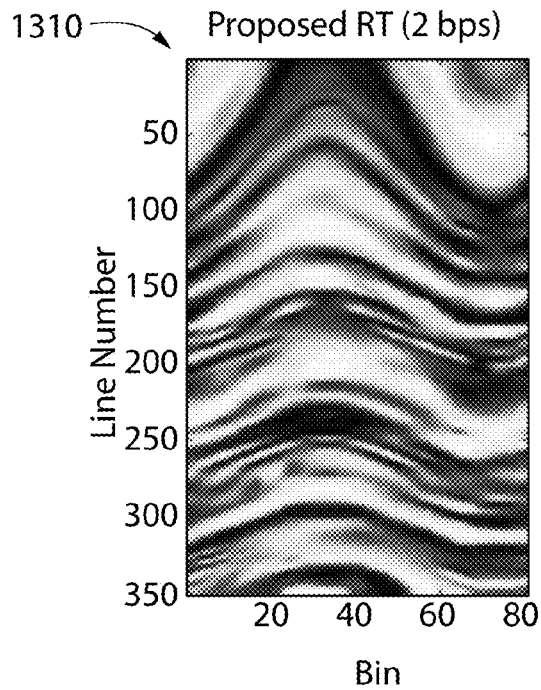
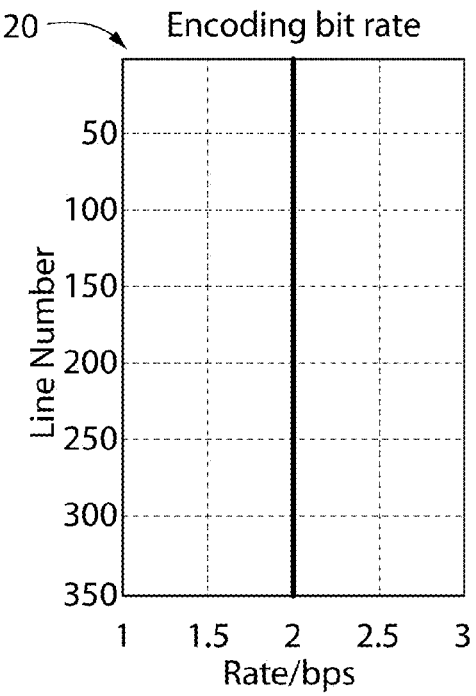
FIG. 13A
FIG. 13B
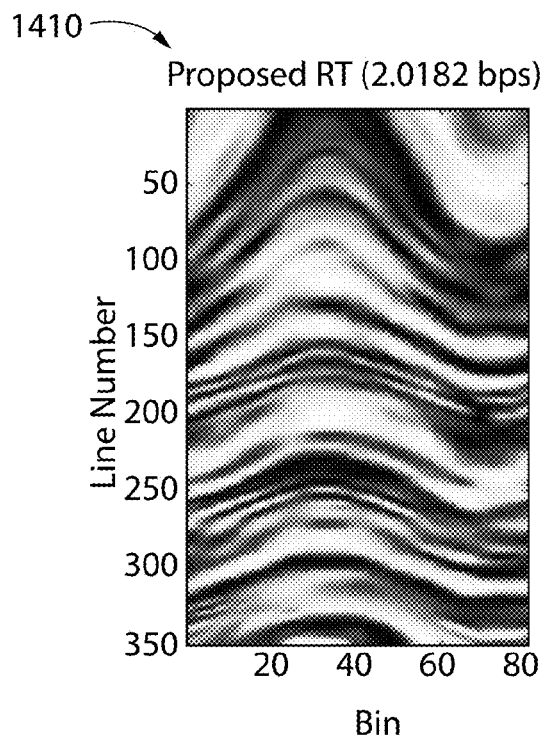
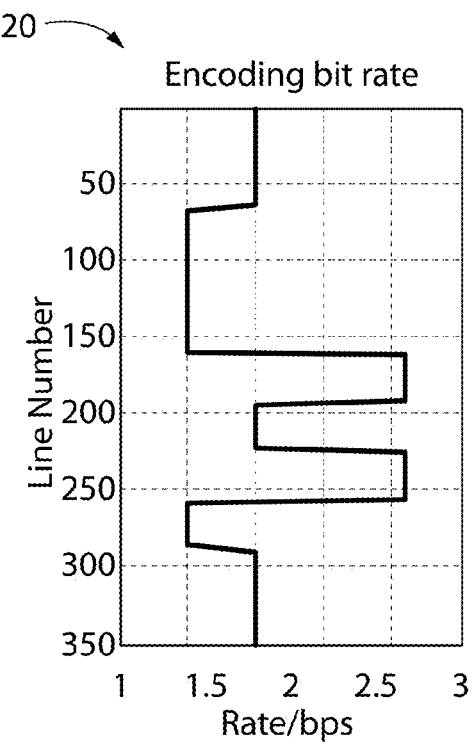
FIG. 14A
FIG. 14B

REAL-TIME ELECTROMAGNETIC TELEMETRY SYSTEM

CROSS-REFERENCE TO RELATED APPLICATION

This application claims priority to and the benefit of U.S. Provisional Application No. 62/357,073, filed on Jun. 30, 2016, the entirety of which is incorporated herein by reference.

BACKGROUND

Electromagnetic ("EM") telemetry may be used to transmit data from a downhole tool in a wellbore to a receiver at the surface. EM telemetry may be bi-directional with half-duplex transmitters and receivers. EM telemetry may implement a time-sharing schedule between uplink and downlink commands Real-time ("RT") data transmission allows for real-time interpretation and decision-making that may be used for steering, well placement, drilling optimization, and safety. While most downhole tools have high-resolution versions of their data in memory (called RM—Recorded Mode), in many cases the RM data may be too large to transmit to the receiver at the surface in real-time.

When there is data corruption (e.g., due to noise burst, signal loss, or other factors), it may be desirable to be able to fetch previous RT data/log sections that were corrupted. Further, it may be desirable to improve the quality of the RT data/log sections previously received. Conventional downhole tools are aware of the measurements that have been taken and the nature of those measurements. Conventional downhole tools are not, however, aware of telemetry channel conditions. The receiver at the surface is aware of the condition of the received signal subjected to the telemetry channel, including whether it was able to decode the transmitted data. However, the receiver at the surface is not aware of the measurements downhole unless the measurements are successfully received and decoded at the surface. If the same information was available to both the downhole tool and the receiver at the surface, then it would be possible to determine the data block that is transmitted, the time of transmission, and the bit rate.

In EM telemetry, mud pulse telemetry, acoustic telemetry, and wired drill pipe telemetry, the transmission rate of the channel is well below the data entropy/acquisition rate. Thus, to support a real-time communication and maintain a minimal latency, the data is compressed prior to transmission. For bi-directional communication, data compression algorithms that output a progressive bit stream may be used.

Traditional compression algorithms, such as JPEG and H.264/AVC, are often optimized for one particular bit-rate/quality level. Once the data is compressed, there is little freedom in changing the bit rate/quality attributes. In fact, the data is re-compressed to meet new target specifications. This poses two main challenges for bi-directional communication. First, after the downlink is received, the downhole tool then accesses the recorded memory and re-compresses the data to a new target transmission rate. The compression of multiple blocks of data can increase the algorithm complexity. Second, in bi-directional communication, a low quality version of the data may already be available at the surface. With conventional compression methods, there is no trivial way to re-use this information. If the user wishes to improve the quality of a block, the downhole tool compresses the data without any knowledge of the available data at the surface.

SUMMARY

This summary is provided to introduce a selection of concepts that are further described in the detailed description. This summary is not intended to identify key or essential features of the claimed subject matter, nor is it intended to be used as an aid in limiting the scope of the claimed subject matter.

A method for improving a quality of data received from a downhole tool in a wellbore is disclosed. The method includes receiving a first block of data from a downhole tool in a wellbore. The first block of data represents a first measurement captured by the downhole tool during a first period of time. At least a portion of a bit budget for a second block of data is allocated to the first block of data to produce an updated first block of data. The method also includes receiving the second block of data from the downhole tool in the wellbore. The second block of data represents a second measurement captured by the downhole tool during a second period of time.

In some embodiments, the method further includes determining that at least a portion of the first block of data is corrupted. The method may further include transmitting a command to the downhole tool in the wellbore instructing the downhole tool to allocate the portion of the bit budget for the second block of data to the first block of data in response to determining that at least a portion of the first block of data is corrupted. The portion of the bit budget for the second block of data that is allocated to the first block of data may be used to re-transmit the portion of the first block of data that was corrupted.

In some embodiments, the portion of the bit budget for the second block of data that is allocated to the first block of data is used to improve a quality of the first measurement. In some embodiments, the first measurement from the first block of data and the second measurement from the second block of data are compressed using a progressive compression algorithm to produce a first compressed bit stream and a second compressed bit stream. The first compressed bit stream and the second compressed bit stream may be stored in a memory of the downhole tool. Additional bits to improve the quality of the first measurement may be retrieved from the first compressed bit stream in the memory of the downhole tool, and the method may further include receiving the additional bits from the downhole tool.

In some embodiments, the second block of data includes fewer bits of data than the first block of data. In some embodiments, allocating the portion of the bit budget includes optimizing a reconstruction quality of the first block of data and the second block of data. In some embodiments, a size of the portion of the bit budget that is allocated to produce the updated first block of data is selected in response to data features present in the first block of data and data features present in the second block of data. The data features in the first block of data and the data features in the second block of data may be estimated in the downhole tool. The data features in the first block of data and the data features in the second block may be estimated by a user or a computer system at the surface and then transmitted to the downhole tool.

In some embodiments, a size of the portion of the bit budget that is allocated to produce the updated first block of data is determined in response to a quality of the first measurement in the first block of data and a quality of the second measurement in the second block of data. In some embodiments, a size of the portion of the bit budget that is allocated to produce the updated first block of data is determined in response to an estimate of a signal-to-noise ratio of a channel through which the first and second blocks of data are transmitted. In some embodiments, the first measurement include a same property as the second measurement or a different property than the second measurement. In some embodiments, the first measurement from the first block of data and the second measurement from the second block are obtained from different sensors in the downhole tool. A size of the portion of the bit budget that is allocated to produce the updated first block of data may be determined in response to: reweighting a quality metric of the first block of data and reweighting a quality metric of the second block of data to model a priority of each of the first and second blocks of data; or reweighting a quality metric of the first block of data and reweighting a quality metric of the second block of data to model the first and second measurements, which are obtained from different sensors in the downhole tool.

In some embodiments, the first block of data occurs when the downhole tool is drilling, and the second block of data occurs when the downhole tool is stationary, is not drilling, or a combination thereof.

In some embodiments, the method further includes performing a drilling action in response to the updated first block of data.

In still other embodiments, the method includes receiving a first block of data from a downhole tool in a wellbore. The first block of data represents a first measurement captured by the downhole tool during a first period of time. It is determined that at least a portion of the first block of data is corrupted. In response to determining that at least a portion of the first block of data is corrupted, a command is transmitted to the downhole tool in the wellbore instructing the downhole tool to allocate at least a portion of a bit budget for a second block of data to the first block of data to produce an updated first block of data. The portion of the bit budget for the second block of data that is allocated to the first block of data is used to re-transmit the portion of the first block of data that was corrupted. The method also includes receiving the second block of data from the downhole tool in the wellbore. The second block of data represents a second measurement captured by the downhole tool during a second period of time.

In some embodiments, the second block of data includes fewer bits of data than the first block of data. In some embodiments, the first block of data occurs when the downhole tool is drilling, and the second block of data occurs when the downhole tool is not drilling.

In some embodiments, the method further includes performing a drilling action in response to the updated first block of data. The drilling action may be varying a trajectory of the downhole tool, varying a weight-on-bit of the downhole tool, varying a flow rate of a fluid being pumped into the wellbore, varying a composition of the fluid being pumped into the wellbore, measuring one or more additional properties in a subterranean formation using the downhole tool, or a combination thereof.

BRIEF DESCRIPTION OF THE DRAWINGS

The accompanying drawings, which are incorporated in and constitute a part of this specification, illustrate embodiments of the present teachings and together with the description, serve to explain the principles of the present teachings. In the figures:

FIG. 3A illustrates a graph showing original and decompressed pressure curves, obtained via a progressive bit stream, and truncated at a first location (e.g., 8% of the bit stream), according to an embodiment.

FIG. 3B illustrates a graph showing the error between the original and decompressed pressure curves of FIG. 2A, according to an embodiment.

FIG. 3C illustrates a graph showing original and decompressed pressure curves, obtained via a progressive bit stream, and truncated at a second location (e.g., 24% of the bit stream), according to an embodiment.

FIG. 3D illustrates a graph showing the error between the original and decompressed pressure curves of FIG. 2C, according to an embodiment.

FIG. 3E illustrates a graph showing original and decompressed pressure curves, obtained via a progressive bit stream, and without truncation (e.g., 100% of the bit stream), according to an embodiment.

FIG. 3F illustrates a graph showing the error between the original and decompressed pressure curves of FIG. 2E, according to an embodiment.

FIG. 13A illustrates a compressed wellbore image where the data rate is constant, according to an embodiment.

FIG. 13B illustrates a graph showing the constant data rate of the image of FIG. 13A, according to an embodiment.

FIG. 14A illustrates a compressed wellbore image where the data rate is not constant, and updates depending upon the data complexity of each block, according to an embodiment.

FIG. 14B illustrates a graph showing the data rate of the image of FIG. 14A, according to an embodiment.

DETAILED DESCRIPTION

Reference will now be made in detail to specific embodiments illustrated in the accompanying drawings and figures. In the following detailed description, numerous specific details are set forth in order to provide a thorough understanding of the disclosure. However, it will be apparent to one of ordinary skill in the art that the disclosure may be practiced without these specific details. In other instances, well-known methods, procedures, components, circuits, and networks have not been described in detail so as not to obscure aspects of the embodiments.

The terminology used in the description of the disclosure herein is for the purpose of describing particular embodiments and is not intended to be limiting. As used in the description of the disclosure and the appended claims, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, operations, elements, and/or components, but do not preclude the presence or addition of one or more other features, integers, operations, elements, components, and/or groups thereof. Further, as used herein, the term "if" may be construed to mean "when" or "upon" or "in response to determining" or "in response to detecting," depending on the context.

Figure 1:
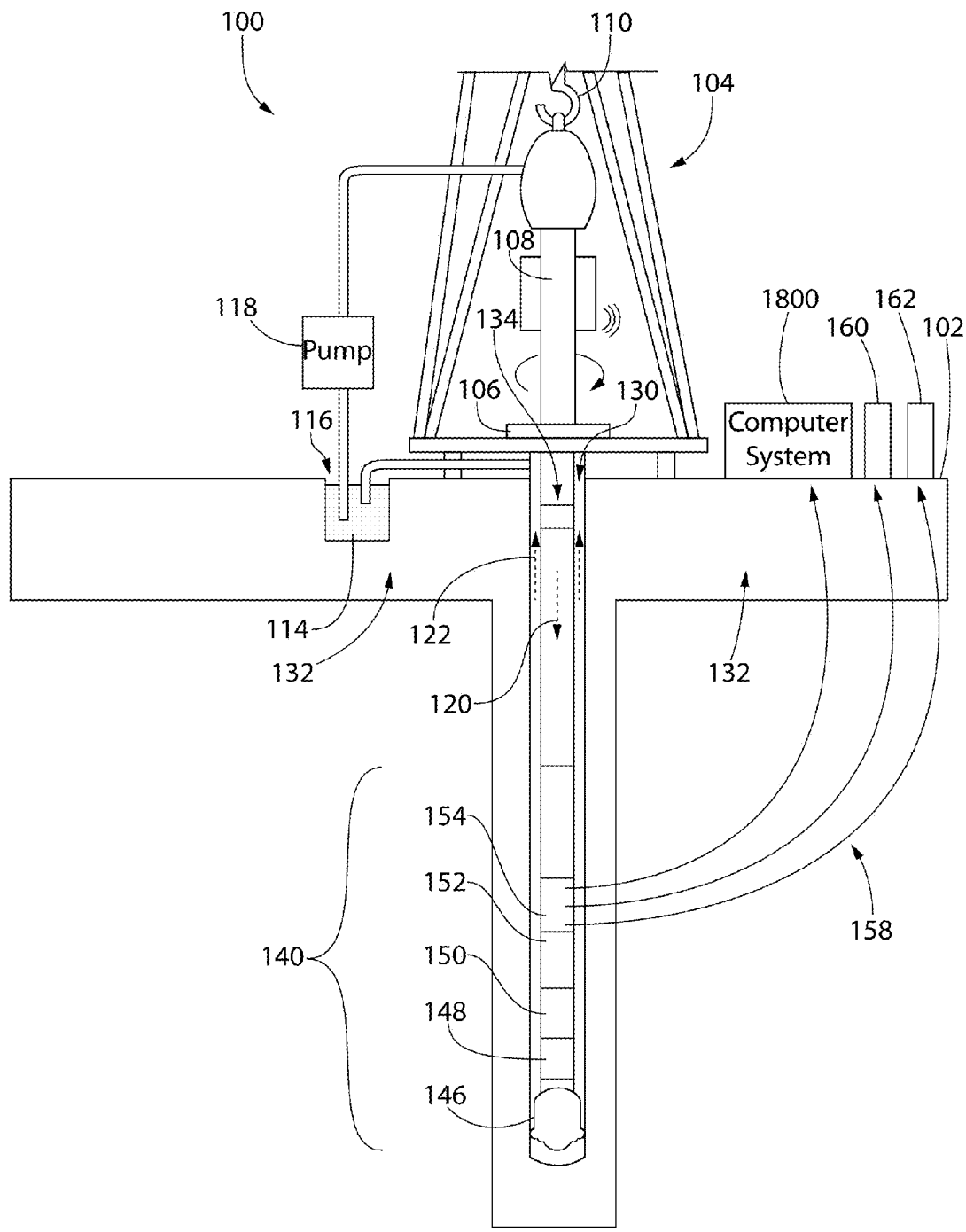
FIG. 1 illustrates side a cross-sectional view of a well site system, according to an embodiment.
Figures 2A, 2B, 2C, 2D:
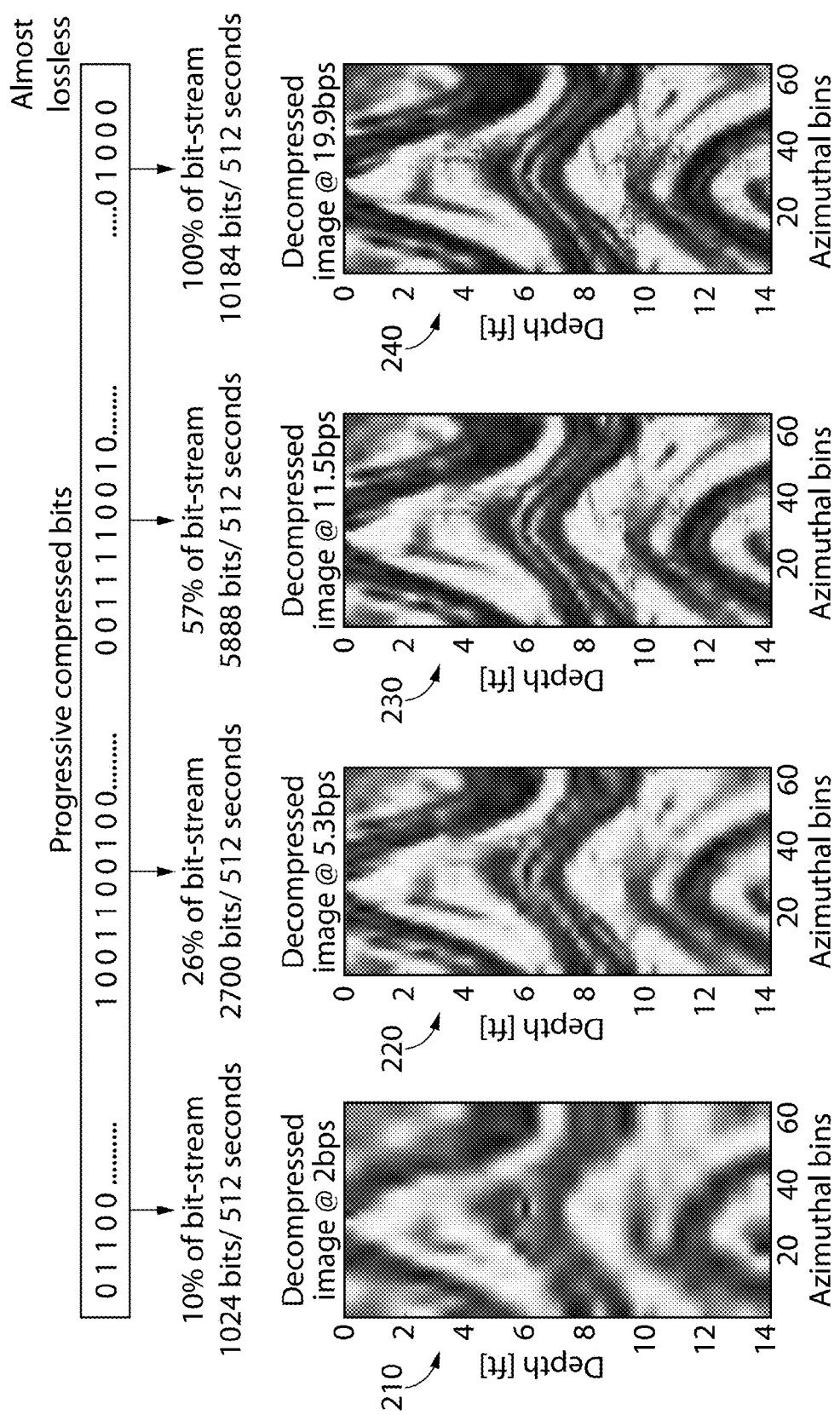
FIG. 2A illustrates a decompressed wellbore image, obtained via a progressive bit stream, and truncated at a first location (e.g., 10% of the bit stream), according to an embodiment.
FIG. 2B illustrates the decompressed wellbore image truncated at a second location (e.g., 26% of the bit stream), according to an embodiment.
FIG. 2C illustrates the decompressed wellbore image truncated at a third location (e.g., 57% of the bit stream), according to an embodiment.
FIG. 2D illustrates the decompressed wellbore image without truncation (e.g., 100% of the bit stream), according to an embodiment.

FIG. 1 illustrates a side cross-sectional view of a well site system 100, according to an embodiment. The well site system 100 may include a rig floor supported by a rig sub-structure and derrick assembly 104 positioned over a wellbore 130 that is formed in a subterranean formation 132. The rig sub-structure and derrick assembly 104 may include a rotary table 106, a kelly or top drive 108, and a hook 110. A drill string 134 may be supported by the hook 110 and extend down into the wellbore 130. The drill string 134 may be a hollow, metallic tubular member. The rotation of the drill string 134 may be generated by the top drive 108. However, the rotary table 106 may optionally generate rotary motion that is transmitted through the kelly.

Drilling fluid or mud 114 may be stored in a pit 116 at the well site. A pump 118 may deliver the drilling fluid 114 to the interior of the drill string 134 via a port in the swivel 112, which causes the drilling fluid 114 to flow downwardly through the drill string 134, as indicated by the directional arrow 120. The drilling fluid exits the drill string 134 via ports in a drill bit 146, and then circulates upwardly through the annulus region between the outside of the drill string 134 and a wall of the wellbore 130, as indicated by the directional arrows 122. In this known manner, the drilling fluid lubricates the drill bit 146 and carries formation cuttings up to the surface 102 as it is returned to the pit 116 for recirculation.

A downhole tool (e.g., a bottom-hole assembly) 140 may be coupled to a lower end of the drill string 134. The downhole tool 140 may be or include a rotary steerable system ("RSS") 148, a motor 150, one or more logging-while-drilling ("LWD") tools 152, and one or more measurement-while-drilling ("MWD") tools 154. The LWD tool 152 may be configured to measure one or more formation properties and/or physical properties as the wellbore 130 is being drilled or at any time thereafter. The MWD tool 154 may be configured to measure one or more physical properties as the wellbore 130 is being drilled or at any time thereafter. The formation properties may include resistivity, density, porosity, sonic velocity, gamma rays, and the like. The physical properties may include pressure, temperature, wellbore caliper, wellbore trajectory, a weight-on-bit, torque-on-bit, vibration, shock, stick slip, and the like. The measurements from the LWD tool 152 may be sent to the MWD tool 154. The MWD tool 154 may then group the sets of data from the LWD tool 152 and the MWD tool 154 and prepare the data for transmission to the surface 102 after proper encoding.

The data may be transmitted to the surface 102 via electromagnetic ("EM") telemetry, mud pulse telemetry, or the like. When using EM telemetry to transmit the data from the downhole tool 140 in the wellbore 130 to the surface 102, a coding method is used. For example, a predetermined carrier frequency may be selected and any suitable modulation method, e.g., phase shift keying ("PSK"), frequency shift keying ("FSK"), continuous phase modulation ("CPM"), quadrature amplitude modulation ("QAM"), or orthogonal frequency division multiplexing ("OFDM"), may be used to superpose the bit pattern onto the carrier wave. In another embodiment, a baseband line code, e.g., pulse position modulation, Manchester coding, biphase coding, or runlength limited codes such as 4b/5b or 8b/10b coding, may be used to superpose the bit pattern onto a waveform suitable for transmission across the MWD channel. This coded signal is applied as a voltage differential across an electrical insulation layer (e.g., ceramic, peek, hard plastic) positioned between upper and lower portions of the downhole tool 140. Due to the voltage differential, an EM telemetry signal (e.g., electrical current) 158 is generated that travels through the subterranean formation 132. More particularly, the EM telemetry signal 158 travels from the lower portion of the downhole tool 140, out into the subterranean formation 132, and bends back toward the upper portion of the downhole tool 140, in an almost semi-elliptical like-shape as determined by the boundary conditions of the subterranean formation 132. The EM telemetry signal 158 from the downhole tool 140 may become attenuated proceeding away from the downhole tool 140 (e.g., upward toward the surface 102) due to the resistivity of the subterranean formation 132. More particularly, the EM telemetry signal 158 may be attenuated in highly conductive portions of the subterranean formation 132, which may shunt the EM telemetry signal 158, and/or the EM telemetry signal 158 may be attenuated by highly resistive portions of the subterranean formation 132, which may restrict the flow of the EM telemetry signal 158 to the surface 102.

One or more sensors (two are shown: 160, 162) may be configured to detect telemetry signals from the downhole tool 140. The sensors 160, 162 may be electrodes, magnetometers, capacitive sensors, current sensors, hall probes, gap electrodes, toroidal sensors, etc. The sensors 160, 162 may be positioned in and/or configured to detect signals from a single wellbore 130 or multiple wellbores. The sensors 160, 162 may operate on land or in marine environments. The sensors 160, 162 may communicate unidirectionally or bi-directionally. In some embodiments, the sensors 162, 168 may communicate with each other and/or with other components of the downhole tools 140 or system 100 to communicate in a full or half duplex manner. For example, in some embodiments, the communication channels between the sensors 162, 168 may be used for full duplex operation and may communicate bi-directionally and simultaneously. The sensors 160, 162 may use automation, downlinking, noise cancellation, etc., and may operate with acquisition software and/or human operators.

In an example, the sensors 160, 162 may be metal stakes positioned at the surface 102 that are configured to detect part of the EM telemetry signal 158 travelling through the subterranean formation 132 and/or a voltage differential between the sensors 160, 162. In other embodiments, one or more of the sensors 160, 162 may be positioned within the wellbore 130 (e.g., in contact with a casing), within a different wellbore, coupled to a blow-out preventer (not shown), or the like. The current and/or voltage differential may be measured at the sensors 160, 162 by an ADC connected to the sensors 160, 162. The output of the ADC may be transmitted to a computer system 164 at the surface 102. By processing of the ADC output, the computer system 164 may then decode the voltage differential to recover the data transmitted by the MWD tool 154 (e.g., the formation properties, physical properties, etc.).

Real-time ("RT") LWD and MWD data may enable real-time evaluation of the subterranean formation 132. The data may also be used for decision-making in steering, well placement, drilling optimization, and safety. The system and method disclosed herein use the bi-directional communication link offered by EM telemetry to enable new applications and improve the overall quality of the received data at the surface 102.

One issue with wireless communication is that in periods of poor telemetry conditions, some blocks of RT data may be corrupted. Conventional systems do not recover these blocks until the downhole tool 140 is available at the surface 102 (e.g., the data is recovered from the RM). By using the bi-directional link, the corrupted data may be re-transmitted to the surface 102 while the downhole tool 140 is still in the wellbore 130 (e.g., during drilling).

Furthermore, a bit allocation scheme may be used that distributes the bit budget between encoding the current block and improving the quality of past blocks. This is in stark contrast to conventional EM telemetry schemes, where the full bit budget is used to encode the current block. The intuition behind this strategy is that certain RT data blocks are easy to encode and can be represented using less than the full number of available bits. The remaining bit budget can hence be used to improve the quality of past data.

Unlike conventional methods, the bit stream is designed such that it can be truncated at an arbitrary location, and each additional bit improves the quality of the decompressed dataset. This means that the compressed bit stream can fully support any quality or bit rate. This is defined as a progressive/scalable bit stream. For bi-directional communication, this allows each block to be compressed in real-time and stored in the RM of the downhole tool 140. After a downlink is received, the bit stream can be fetched from the RM and simply truncated to meet a particular bit rate. In addition, re-using the data available at the surface 102 also becomes possible. The downhole tool 140 can simply keep track of the number of bits that have been transmitted to the surface 102 for each block.

FIGS. 2A-D illustrate wellbore images 210, 220, 230, 240 obtained using a progressive wellbore image compression algorithm. The four images 210, 220, 230, 240 are decompressed from the same bit stream and truncated at different locations. More particularly, the image 210 is truncated at 1024 bits (e.g., 10% of the bit stream), the image 220 is truncated at 2700 bits (e.g., 26% of the bit stream), the image 230 is truncated at 5888 bits (e.g., 57% of the bit stream), and the image 240 is not truncated (e.g., 10184 bits: 100% of the bit stream).

FIGS. 3A-F illustrate an example of a progressive coding scheme applied to a one-dimensional (1D) pressure curve. More particularly, FIG. 3A illustrates a graph 310 showing original and decompressed pressure curves, obtained via a progressive bit stream, and truncated at 320 bits (e.g., 8% of the bit stream), and FIG. 3B illustrates a graph 320 showing the error between the original and decompressed pressure curves of FIG. 2A, according to an embodiment. FIG. 3C illustrates a graph 330 showing original and decompressed pressure curves, obtained via the progressive bit stream, and truncated at 960 bits (e.g., 24% of the bit stream), and FIG. 3D illustrates a graph 340 showing the error between the original and decompressed pressure curves of FIG. 2C, according to an embodiment. FIG. 3E illustrates a graph 350 showing original and decompressed pressure curves, obtained via the progressive bit stream, and without truncation (e.g., 4000 bits: 100% of the bit stream), and FIG. 3F illustrates a graph 360 showing the error between the original and decompressed pressure curves of FIG. 2E, according to an embodiment.

EM telemetry allows bi-directional communication through time-sharing. Periods of uplink and downlink may be set up in advance. The frame format for uplinking is pre-programmed in advance, although it is possible to change from one frame format to another. In at least one embodiment, the EM telemetry may be or include a smart, query-based adaptive data delivery. EM telemetry faces the issue of resistivity and noise from the subterranean formation 132. Formation resistivity impacts signal strength at the receiver (e.g., sensors 160, 162), and although formation models may be available, there is uncertainty in them. Further, drilling dynamics may impact signal strength. Noise is also major challenge, and can change dramatically. The sum of these two challenges is that the signal-to-noise ratio ("SNR") at the receiver may change and be unpredictable.

Recovering Corrupted Data with Bi-directional Communication

Log data and images may be processed one block at a time. Compression is applied, and the compressed bits are transmitted through the channel. Thus, there is a delay in the reception and decompression at the surface 102.

Figure 4:
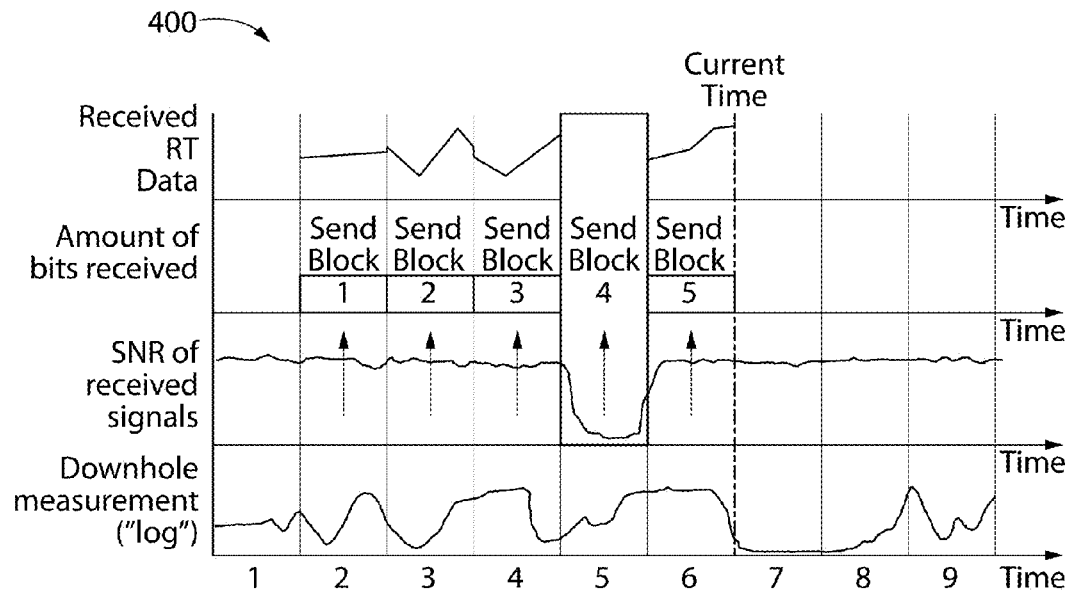
FIG. 4 illustrates a graph showing a corrupted block of transmitted data, according to an embodiment.

FIG. 4 illustrates a graph 400 showing a corrupted block of transmitted data, according to an embodiment. In the example of FIG. 4, the user is concerned with one downhole measurement or log, and at each time block, 100% of the bit rate is allocated to this measurement. At low SNRs, the bit stream may be corrupted, causing complete blocks of data to be lost. In FIG. 4, block 4 is not received properly (e.g., the data is corrupted). In a half-duplex communication, this data may not be available until the RM of the downhole tool 140 is recovered at the surface 102.

With bi-directional communication, the user may downlink a command that requests the downhole tool 140 to re-transmit the data in block 4 to the surface 102. The downlink may occur automatically if the cyclic redundancy check ("CRC") fails, or be initiated by the user. The status of several blocks may be compressed jointly and sent to the downhole tool 140 to reduce the downlink transmission time.

A protocol to handle this request may be set in the downhole tool 140 (e.g., in the MWD tool 154). The protocol may include instructions for when the block is to be re-transmitted, and how many bits are used to represent the data. A general trade-off when designing the protocol is latency and quality of reconstruction. If the priority is to achieve a high quality of the re-transmitted block, then the full bit budget may be used on encoding past data. This approach, however, may delay the transmission of the current block.

To reduce the delay, the protocol may also split the bit budget between current and past blocks. For example, the MWD tool 154 may send both data from block 4 (e.g., including the missing data), and from block 6 (e.g., the current block). An ad-hoc solution may be to spend a first portion (e.g., 50%) of the bit budget on encoding the current block, while the remaining portion (e.g., 50%) may be allocated to past data.

Figure 5:
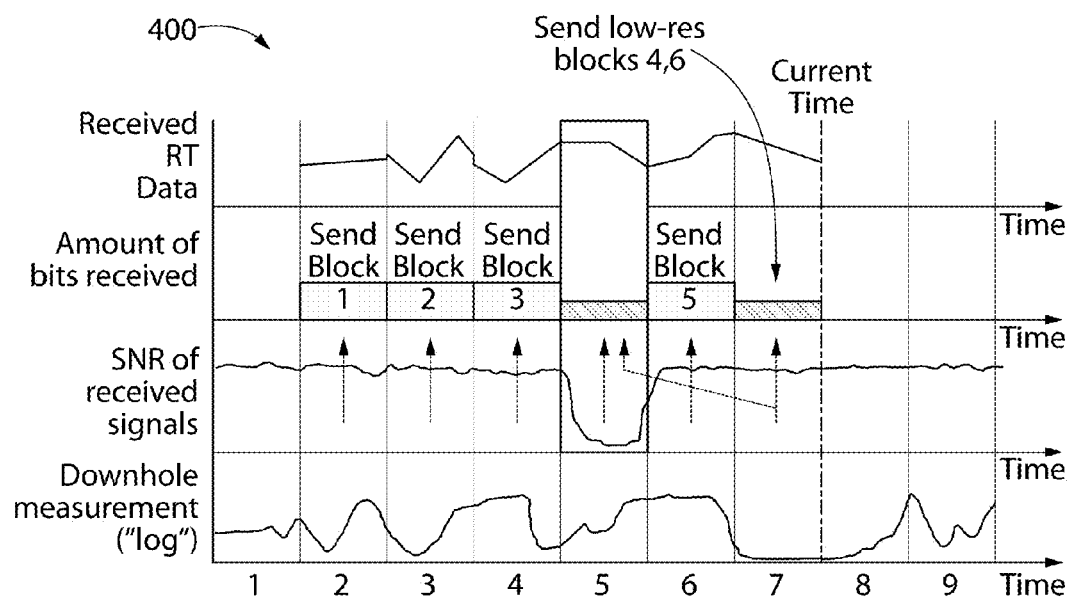
FIG. 5 illustrates the graph of FIG. 4 showing a portion (e.g., 50%) of the bit budget from block 6 being used to encode a low resolution version of block 4, according to an embodiment.

FIG. 5 illustrates the graph 400 of FIG. 4 showing a portion (e.g., 50%) of the bit budget from block 6 being used to encode a low resolution version of block 4, according to an embodiment. As shown in FIG. 5, rather than having no data from block 4, a low-resolution version of the data in block 4 may be obtained with bi-directional communication. The user may also request the data from block 4 to be sent in the next several time blocks, to trade-off delay in obtaining data from block 4 such that the quality penalty for blocks 5, 6, ... is not as severe.

Both progressive and non-progressive compression algorithms may be used to support re-transmission of corrupted data. However, with a progressive algorithm, the data may be compressed a single time during data acquisition and then stored in RM. Then, when a block is requested, the bit stream may be fetched from RM and truncated to meet a target bit budget. In the case of a non-progressive method, the raw data may be fetched from RM and then compressed to meet a target bit budget.

Rate Distribution between Current/past Data

Figure 6:
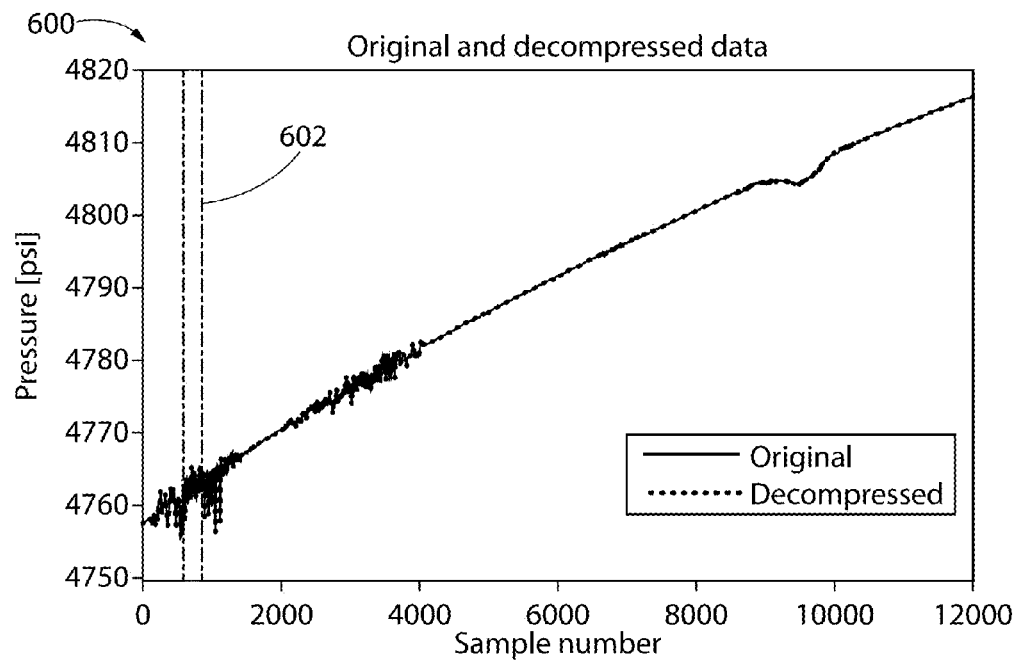
FIG. 6 illustrates a graph showing original and decompressed data curves using a constant rate per block, according to an embodiment.
Figure 7:
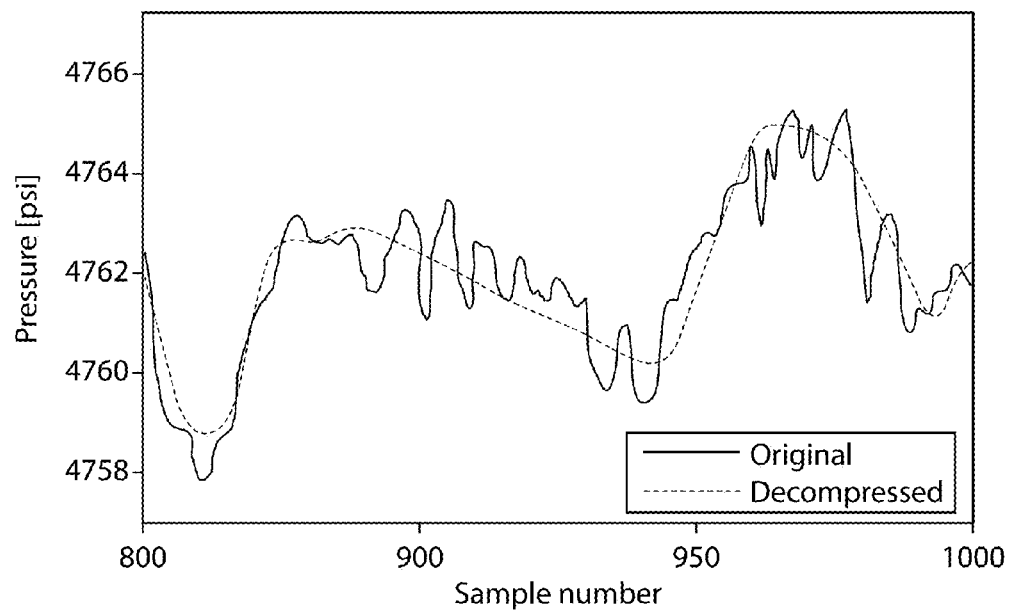
FIG. 7 illustrates an enlarged portion of the graph of FIG. 6, according to an embodiment.
Figure 8:
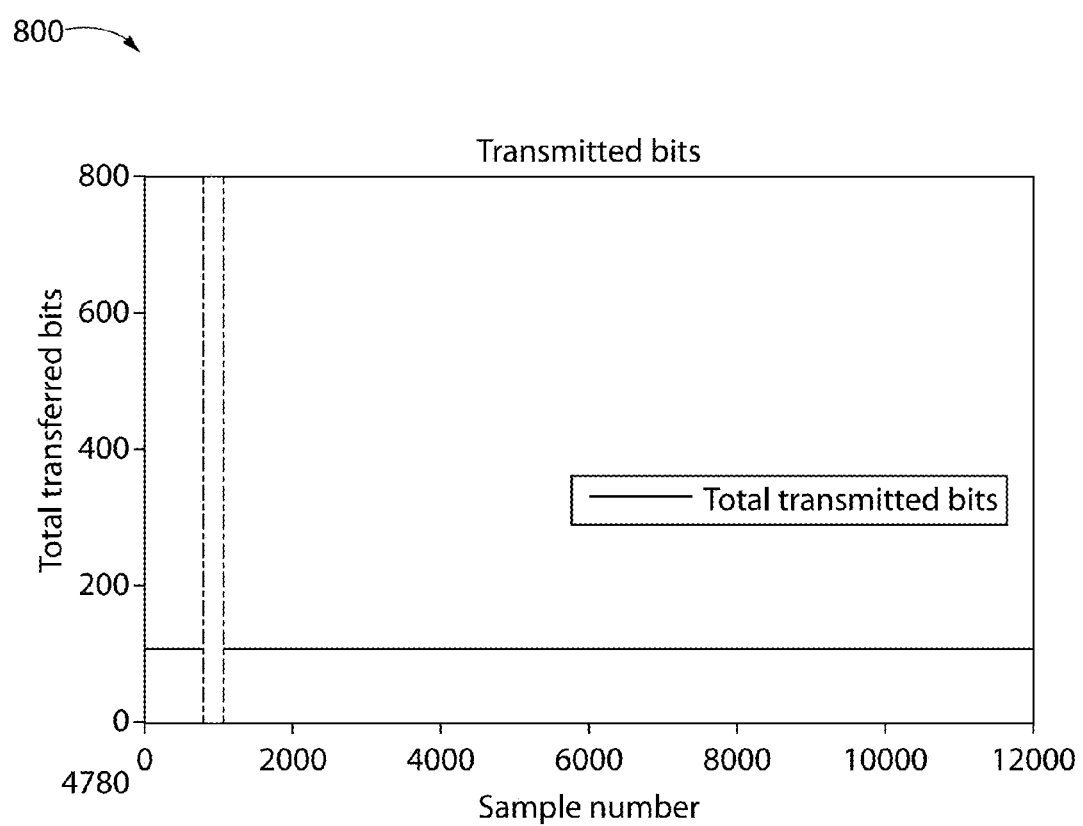
FIG. 8 illustrates a graph showing the constant data rate in FIG. 6, according to an embodiment.

As mentioned above, in EM telemetry, the full bit budget may be used to compress the current data block. An example of this strategy, where a constant 128 bits are used to encode each block, is shown in FIGS. 6-8. FIG. 6 illustrates a graph 600 showing original and decompressed data curves using a constant rate per block (e.g., 128 bits), according to an embodiment. As will be appreciated, some blocks may be easy to encode (e.g., less bits may be used), while other blocks may use more bits (e.g., to describe high-frequency content). An example of a block of data is highlighted at 602.

FIG. 7 illustrates an enlarged portion of the graph 600 showing the highlighted block of data 602, according to an embodiment. FIG. 8 illustrates a graph 800 showing the constant data rate (e.g., 128 bits) in FIG. 6, according to an embodiment. The constant/uniform rate allocation strategy is not optimal for this type of data. Certain blocks are relatively easy to encode, while others use more bits to describe high information content.

Figure 9:
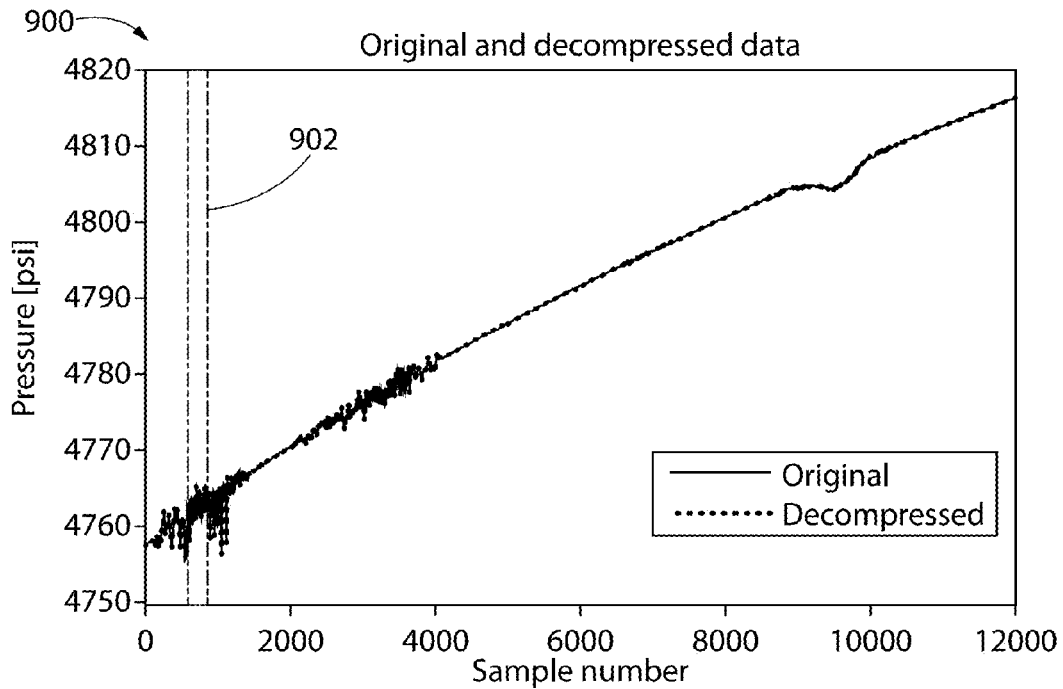
FIG. 9 illustrates a graph showing original and decompressed data curves using backward adaptive rate allocation, according to an embodiment.
Figure 10:
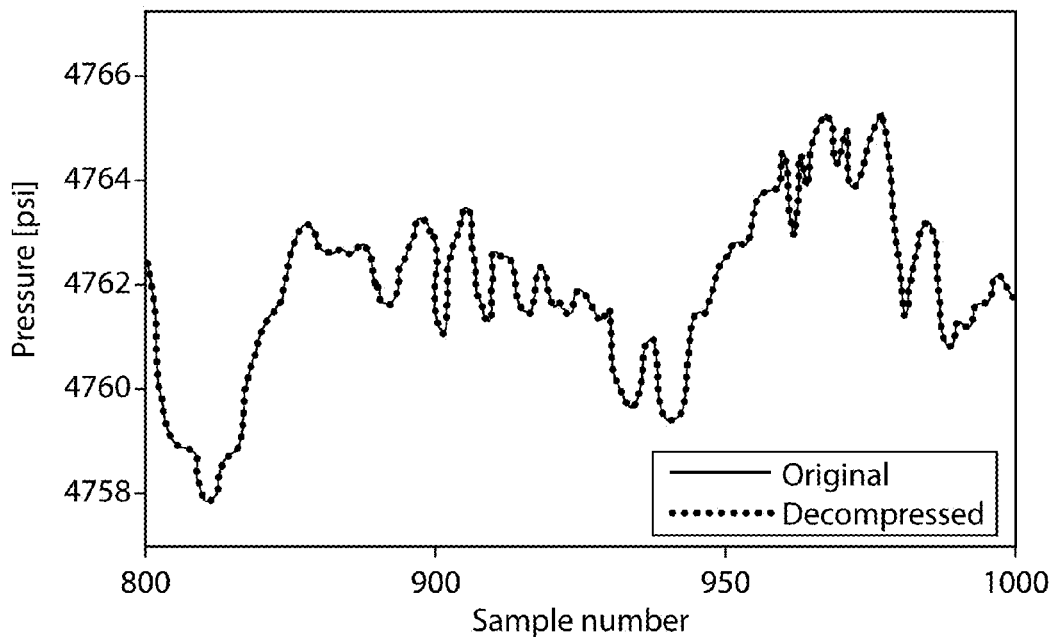
FIG. 10 illustrates an enlarged portion of the graph of FIG. 9, according to an embodiment.
Figure 11:
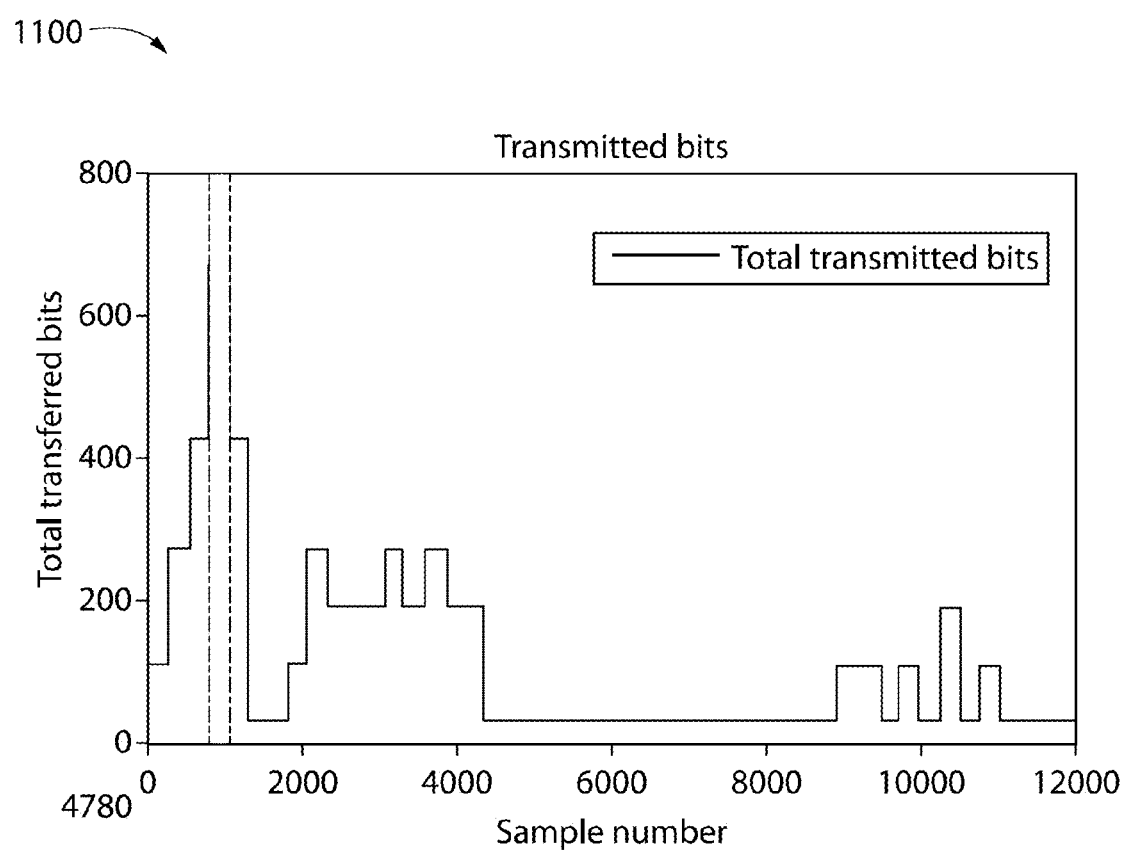
FIG. 11 illustrates a graph showing the varying data rate in FIG. 9, according to an embodiment.

Thus, instead of allocating the full bit budget to the current block, a portion of the bit budget may (e.g., sometimes) be used to improve the quality of past data. More particularly, blocks with low information content may be allocated a small number of bits, while previous, more complex data blocks may be gradually improved with time. An example of this rate allocation using strategy is shown in FIGS. 9-11. FIG. 9 illustrates a graph 900 showing original and decompressed data curves using backward adaptive rate allocation, according to an embodiment. FIG. 10 illustrates an enlarged portion of the graph 900 showing the highlighted block of data 902, according to an embodiment. FIG. 11 illustrates a graph 1100 showing the varying data rate in FIG. 9, according to an embodiment. The resulting rate distribution is non-uniform and highly dependent on the complexity of the data. It may be seen that the decompressed data more closely tracks the original data in FIG. 10 than in FIG. 7.

Rate Allocation Strategies

Several techniques may be used determine the rate allocation between the current and past data blocks. One technique may include an explicit downlink initiated by a user at the surface 102. Another technique may include automation downhole that is aimed at reconstructing specific data features or using telemetry quality. A third technique may include automation downhole that is aimed at optimizing the mean-squared error reconstruction.

Downlink Initiated by a Surface User to Specify Rate Allocation and Request Previous Blocks The simplest approach to change the rate allocation is by a downlink initiated by a user at the surface 102. The user can specify which blocks from the past the user would like to improve. The user can also specify the bit rate distribution between the current and past blocks. For example, the user can specify that 50% of the bit budget may be used to encode the real-time (i.e., current) block, while the remaining bit budget may be used for improving past blocks indicated by the user.

Figure 12:
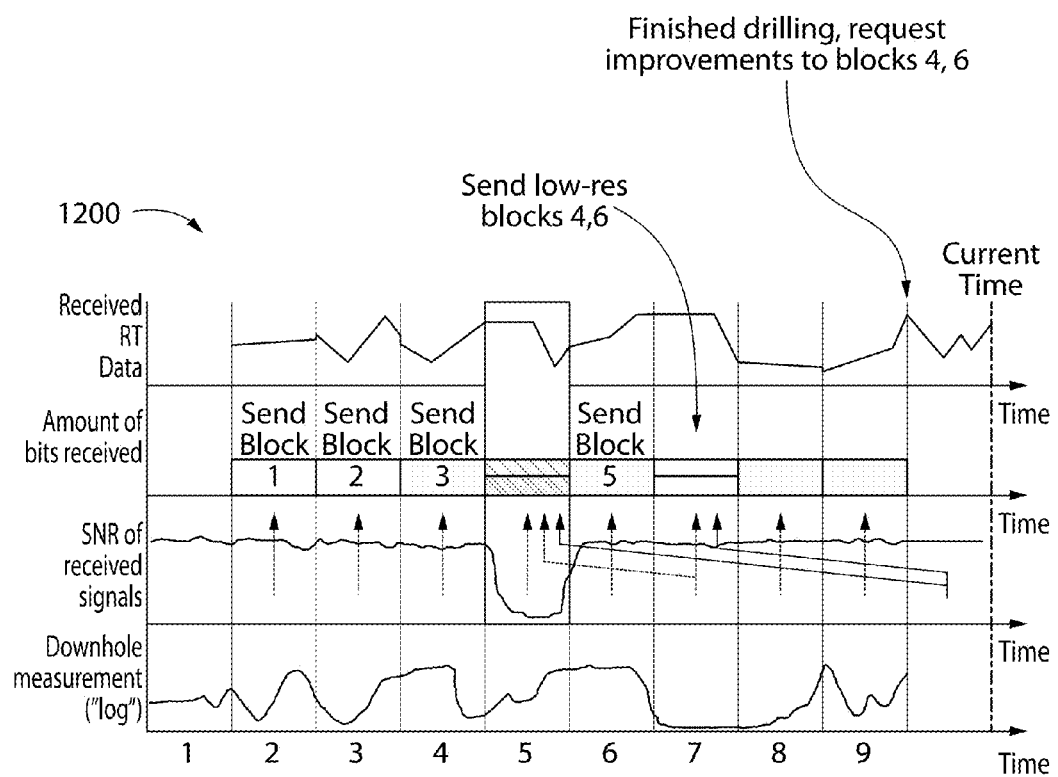
FIG. 12 illustrates a graph where the drilling is completed in block 9, and the full bit budget is then allocated to improving past data blocks, according to an embodiment.

This technique may allow the user to identify data intervals when the user is not interested in the current measurement (e.g., when the downhole tool 140 is stationary, when the downhole tool 140 is not drilling, or when the downhole tool 140 is being tripped into or out of the wellbore 130). In these intervals, the full bit budget can be allocated to improving the past data. An example is shown in FIG. 12, which illustrates a graph 1200 where the drilling is completed in block 9, and the full bit budget is then allocated to improving past data blocks.

The user can also transmit information on the rate of penetration ("ROP") of the downhole tool 140, and this data may be used to determine a rate allocation strategy. Intuitively, at a high ROP, less time is spent on a particular depth interval, and thus the quality of the real-time data may be lower. Thus, more bits may be allocated to these regions. To fully leverage this protocol, when there is a downlink to request certain blocks, the downlink may inform the downhole tool 140 of the data block index, and which parts of the bit stream corresponding to that data block are desired. Therefore, the downhole tool 140 can send the modified segment of the compressed bit stream.

Downhole Automation—Telemetry Quality/feature-based Reconstruction

The rate allocation can also be determined by the information content in the data from the LWD tool 152 or the MWD tool 154. For example, in wellbore images, specific features (e.g., bed boundaries, fractures, and breakouts) may be more useful than other features. Therefore, blocks with this data may be allocated a larger fraction of the bit budget. Thus, downhole feature detection algorithm (e.g., using a Hough transform) may be used. If the specific features are detected, a flag with the corresponding block ID can be sent to the surface 102, and additional bits can be adaptively allocated to these blocks.

In a different strategy, a downhole estimate of the uplink channel SNR (e.g., based on measured gap impedance to estimate the signal strength in the subterranean formation 132) can be used to identify blocks sent during telemetry signals with a low SNR. These blocks can then be flagged for re-transmission. In another embodiment, a low transmission rate may be used to reduce the probability of bit errors. The blocks can then be updated when the SNR improves. This may be particularly useful for EM telemetry, where the SNR can fluctuate depending on the formation resistivity. These variations can be sudden and cause transmission errors. For example, if the downhole tool 140 tool is transmitting in a zone where formation resistivity is changing (or tool contact with the formation is intermittent, causing noise), this condition may be detected downhole as a variation of the gap impedance. In that zone, the downhole tool 140 can increase the number of blocks it stores in memory and put them in a queue for re-transmission at the next opportunity or pipe connection.

One more example to optimize the uplink utilization for retransmission based on automatic downhole condition is the detection of severe stick-slip ("SS") and shock which severely affect NMR measurements. During SS intervals, instead of uplinking non-usable NMR data, the uplink bandwidth can be used by the downhole tool 140 to automatically retransmit blocks of the desired interval.

Downhole Automated—Quality Metric Optimization

The rate distribution between the current and past blocks can also be fully automated by posing the allocation as an optimization problem. The goal of the approach is to optimize a quality metric, such as the mean squared error of the decompressed data at the surface 102. To introduce the optimization algorithm, it may be assumed that the downhole data is split into blocks of length N defined by $Y_i=[y_i^1, y_i^2, \ldots, y_i^N]$, where the subscript i denotes the acquisition time of each block. The reconstruction error of this block at the surface 102 is defined $D_i(R_i)$:

$$\|Y_i - \hat{Y}_i(R_i)\|_2^2, \quad (1)$$

where $\hat{Y}_i(R_i)$ is the decompressed version of $Y_i$ at the surface 102, and $R_i$ is total number of bits used to compress the block. It may be assumed that this function is known or estimated downhole.

After the acquisition of the i-th block, the MWD tool 154 may transmit a total of $R_B$ bits to the surface 102. The optimization problem can therefore be defined by:

$$\underset{R_1, R_2, \ldots, R_4}{\operatorname{argmin}} \left( \sum_{j=1}^{i} D_i(R_i) \right), \text{ such that } R_1 + R_2 + \ldots + R_i \leq R_B \quad (2)$$

The available information at the surface 102 may not be re-used. However, if the compression algorithms output a progressive bit stream, then the new distortion for i-th block can be defined by:

$$D(\Delta R_i | R_i) = \|Y_i - \hat{Y}_i(\Delta R_i + R_i)\|_2^2. \quad (3)$$

In other words, Equation (3) assumes that a total of $R_i$ bits have been transmitted to the surface 102 in the past. Therefore, the distortion may be affected by an additional $\Delta R_i$ bits that are sent to the surface 102. The total distortion of the block after an additional $\Delta R_i$ bits are received is equivalent to compressing the block with $R_i + \Delta R_i$ bits.

Using this definition, the rate allocation problem across the blocks may be defined by:

$$\underset{\Delta R_1, \Delta R_2, \ldots, \Delta R_i}{\operatorname{argmin}} \left( \sum_{j=1}^{i} D_i(\Delta R_i | R_i) \right), \quad (4)$$

such that $\Delta R_1 + \Delta R_2 + \ldots + \Delta R_i \leq R_B$

An issue to be addressed is that the distortion contribution for each block may not be equal. For example, minimizing the distortion of a current block may be more useful than the transmission of the blocks from several hours ago. This property can be modelled by reweighting the distortion of each block with a scaling factor $w_i$ that can take on values in the range of [0, 1]. The weighting can also model the measurement quality. For example, if the data quality is low due to SS or shock, a lower weighting can be given to these blocks.

The optimization in Equation (4) is solved after the acquisition of each new block. The update bits are fetched from the RM and transmitted to the surface 102. Several methods can be used to minimize constrained optimization problem (e.g., dynamic programming and Lagrangian multipliers).

This approach may be scaled to multiple channels/sensors. The total distortion in Equation (4) can be summed over the channels and data blocks. The optimization may then output how many bits should be allocated to each channel. If the channels are from different measurements, the distortion may be re-weighted prior to minimization because the reconstruction of two measurements (e.g., pressure and resistivity) may not be the same. A minimum bit rate can also be allocated to each channel such there is no missing data at the surface 102. These details may be downlinked by the user, or defined in ad-hoc manner by simulating the compression on example data prior to running to the job.

Furthermore, the prioritization of one channel over others can be modelled as a specific constraint on the data. In the current formulation, a bit-rate constraint is used. In other formulations, the distortion may be re-weighted in Equation (4). An example of an adaptive rate allocation on wellbore images is shown in FIGS. 13A, 13B, 14A, and 14B. More particularly, FIG. 13A illustrates a compressed wellbore image 1310 where the data rate is constant, and FIG. 13B illustrates a graph 1320 showing the constant data rate of the image 1310 of FIG. 13A, according to an embodiment. FIG. 14A illustrates a compressed wellbore image 1410 where the data rate is not constant, and updates depending upon the data complexity of each block, and FIG. 14B illustrates a graph 1420 showing the data rate of the image 1410 of FIG. 14A, according to an embodiment. In FIGS. 13A and 13B, a constant 2 bps is applied to each block. In FIGS. 14A and 14B, an adaptive strategy is used. It can be seen that by allocating a higher bitrate around line number 150-250, the quality of the decompressed image may be improved, at negligible decline in quality around line number 50-150 and 250-300.

Figure 15:
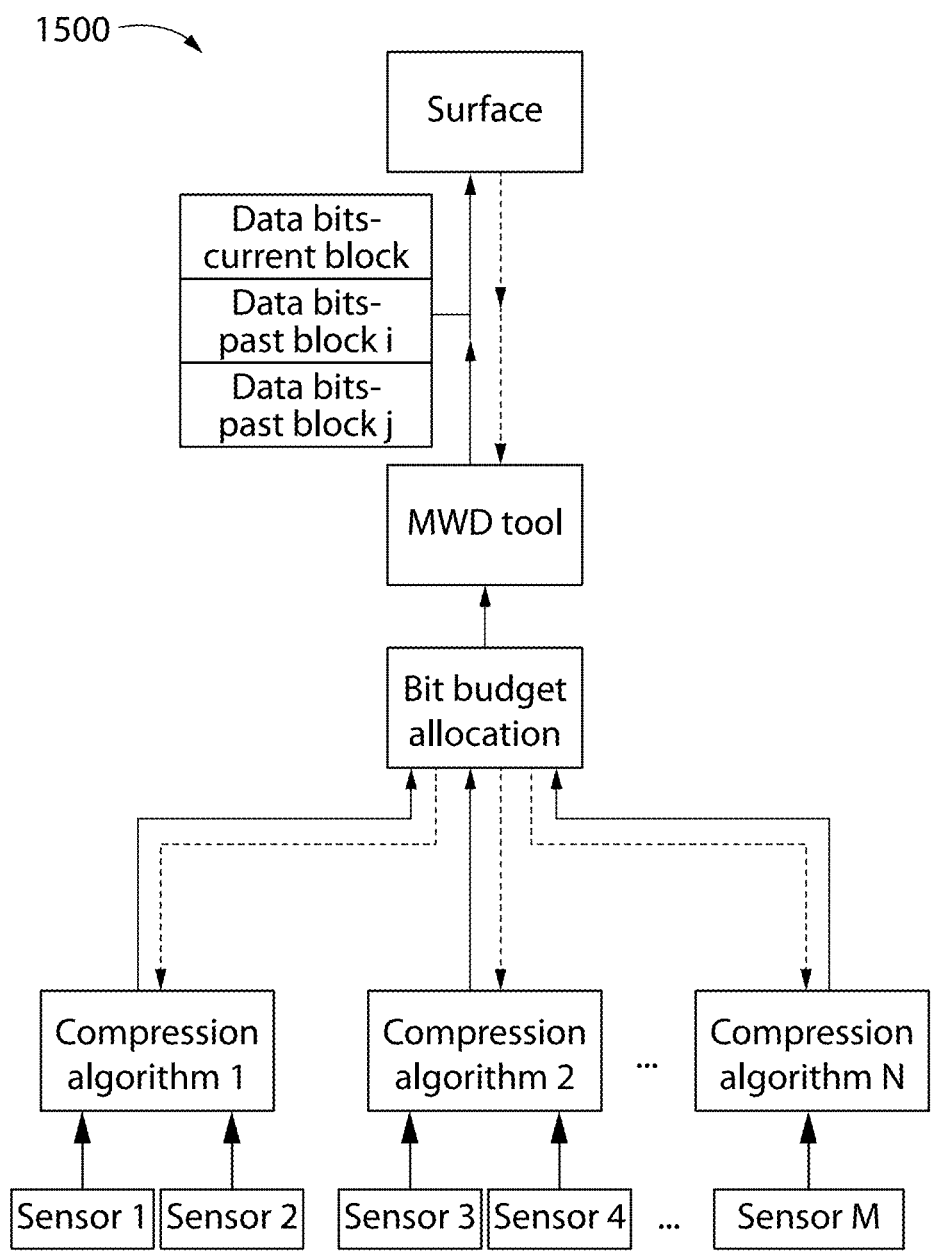
FIG. 15 illustrates a schematic view of a system for improving a quality of data received from a downhole tool in a wellbore, according to an embodiment.

FIG. 15 illustrates a schematic view of a system 1500 for improving a quality of data received from a downhole tool 140 in a wellbore 130, according to an embodiment. The communication between the receiver (e.g., sensors 160, 162) at the surface 102 and the downhole tool 140 (e.g., MWD tool 154) may be via EM or mud pulse telemetry. The downlink signals are optional and are shown in dashed arrows. When downlink signals are used, they may include the block ID of the corrupted data, the block ID of the data to be improved, a rate allocation, or a combination thereof.

The downhole tool 140 may include one or more progressive compression algorithms. Each progressive compression algorithm may be specialized for different data (e.g., 1D logs, wellbore images, multi-dimensional data, etc.). Thus, the data from each downhole sensor may be compressed by an algorithm specialized for the type of data measured. The uplink data may include data bits from current and past blocks for multiple sensor/measurements.

Figure 16A:
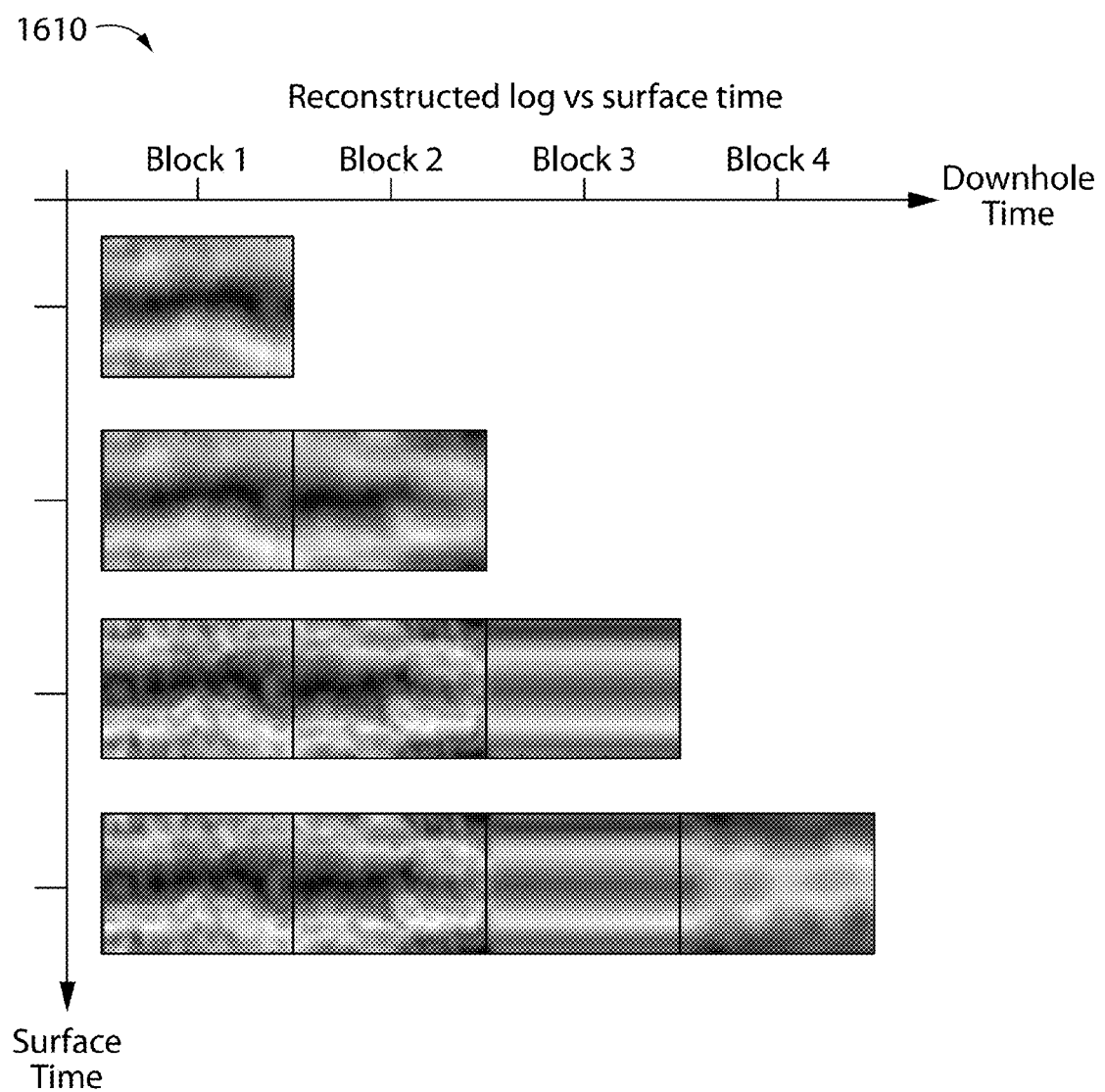
FIG. 16A illustrates a graph showing a reconstructed log vs. surface time, according to an embodiment.
Figure 16B:
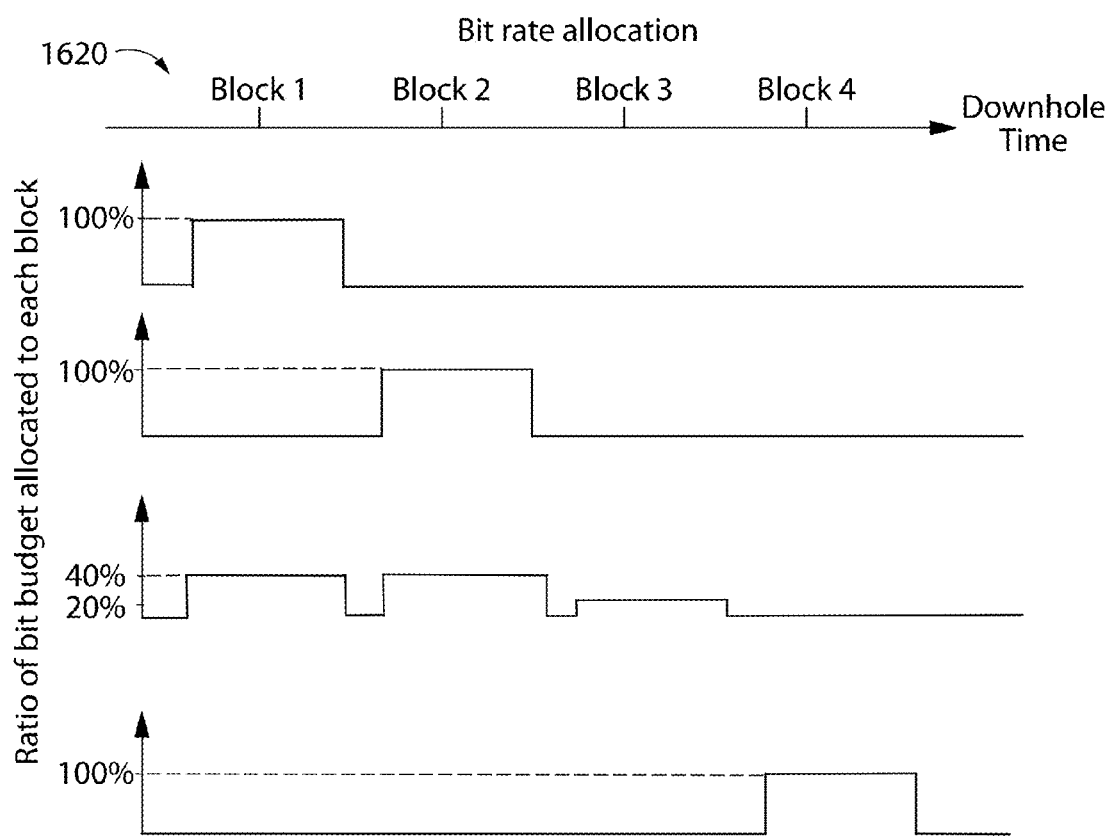
FIG. 16B illustrates a graph showing the bit rate allocation for the graph in FIG. 16A, according to an embodiment.
Figure 16C:
FIG. 16C illustrates downhole data in recorded mode, according to an embodiment.

FIG. 16A illustrates a graph 1610 showing a reconstructed log vs. surface time, FIG. 16B illustrates a graph 1620 showing the bit rate allocation for the graph 1610, and FIG. 16C illustrates the downhole data in recorded mode, according to an embodiment. In this example, the data in block 3 is not as useful to the user as the data in blocks 1 and 2. As a result, a portion of the bit budget from block 3 (e.g., 80%) may instead be used to improve the quality of the data in blocks 1 and 2. As may be seen, the image quality of blocks 1 and 2 in FIG. 16A increases over time to appear more like blocks 1 and 2 in the downhole data (e.g., recorded mode) 1630.

Figure 17:
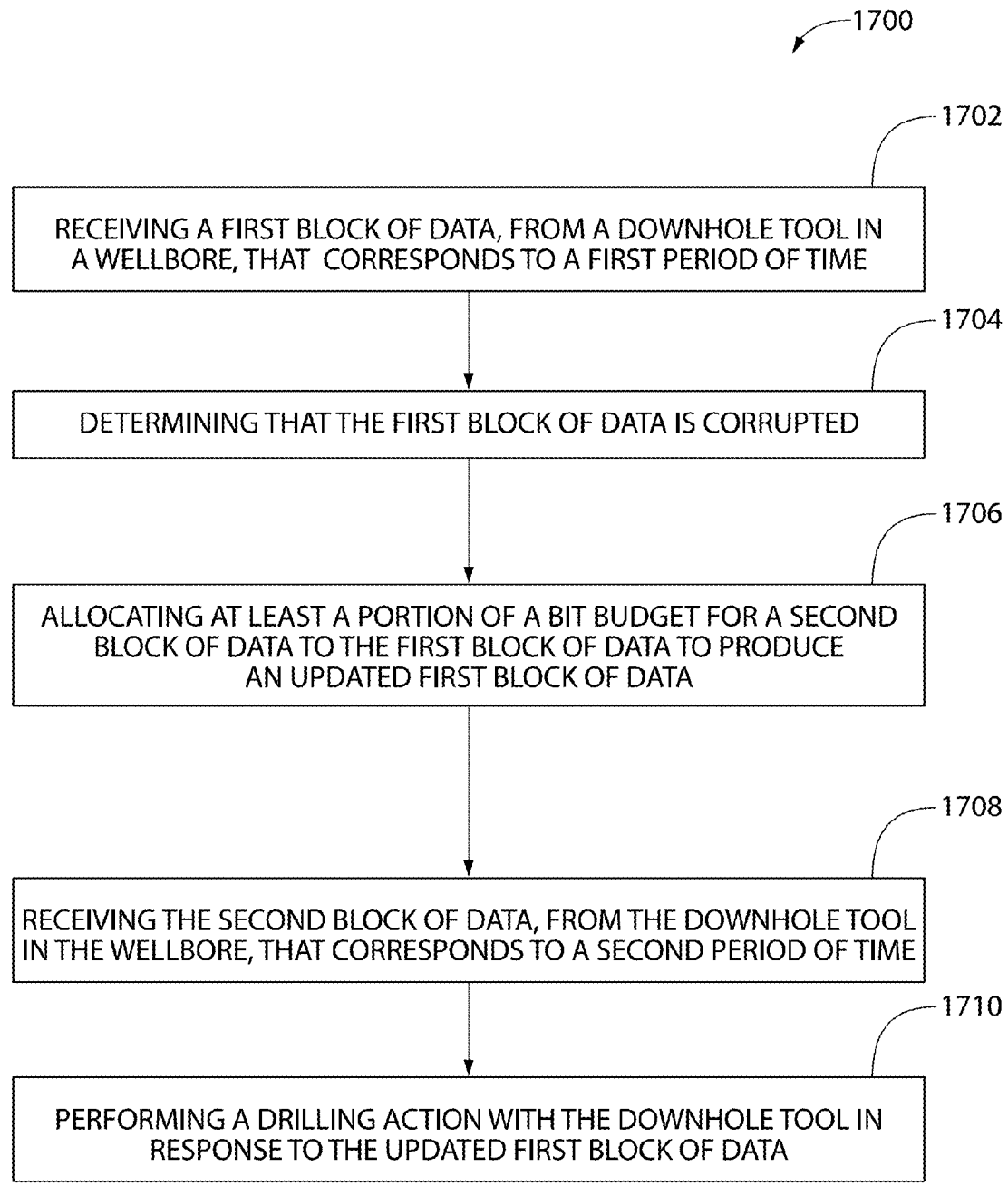
FIG. 17 illustrates a flowchart of a method for improving a quality of data received from a downhole tool in a wellbore, according to an embodiment.

FIG. 17 illustrates a flowchart of a method 1700 for improving a quality of data received from a downhole tool 140 in a wellbore 130, according to an embodiment. The method 1700 may include receiving, at a computer system 164 at the surface 102, a first block of data from a downhole tool 140 in a wellbore 130, as at 1702. The first block of data includes a first measurement captured by the downhole tool 140 during a first period of time. The first block of data is transmitted by the downhole tool 140 to the receiver (e.g., sensors 160, 162) while the downhole tool 140 is in the wellbore 130. The first measurement may include formation properties, physical properties, or the like.

The method 1700 may also include determining that the first block of data is corrupted, as at 1704. In another embodiment, rather than being corrupted, the first block of data may not include sufficient bits to adequately represent the property being measured (e.g., when the first block of data represents a wellbore image).

In response to determining that the first block of data is corrupted (or that the first block of data includes insufficient bits to adequately represent the property being measured), the method 1700 may also include allocating at least a portion of a bit budget for a second block of data to the first block of data to produce an updated first block of data, as at 1706. The allocation may also be used for subsequent blocks of data (e.g., a third block of data). The second block of data may be selected for allocation when the user determines that the second block of data is less useful than the first block of data. For example, the first block of data may occur during drilling, and the second block of data may occur when drilling has ceased and an additional joint is being added to the drill string 134.

In one example, at least a portion of the bit budget originally allocated to the second block of data may be used to re-transmit at least a portion of the first block of data (e.g., the corrupted portion). In another example, at least a portion of the bit budget originally allocated to the second block of data may be used to transmit additional data related to the first block of data (e.g., to produce a higher-quality wellbore image). A user at the surface may select the portion of the bit budget that is to be allocated to the first block of data, or the allocation may be selected automatically (e.g., using an algorithm on the computer system 164).

In at least one embodiment, a downlink command may be transmitted, from the computer system 164 at the surface 102, to the downhole tool 140 instructing the downhole tool 140 to allocate the portion of the bit budget for the second block of data to the first block of data. The downlink command may specify particular blocks of data for bit allocation and/or the bit rate for the allocation. The downlink command may also instruct the downhole tool 140 to specify particular blocks of data for bit allocation and/or the bit rate for the allocation. When downlinking the status of a plurality of blocks of data, the data may be compressed jointly to minimize transmission time. In another embodiment, transmitting the command may be omitted because the downhole tool 140 may already have the command stored therein.

An algorithm may be run in the downhole tool 140 to automatically allocate the bit rate between the current block (e.g., second block of data) and the previous blocks (e.g., the first block of data). Different quality criteria may be used, such as MMSE, MSNR, peak error, or a combination thereof. These quality criteria may be or include known criteria from the domain of data and image compression. An estimate of the channel SNR may be used to update the bit rate allocation. The quality of the measurements (e.g., the data affected by noise or SS) may be used to distribute the bit budget. For example, fewer bits may be allocated to lower quality data.

When multiple measurement channels are used, the distortion may be minimized in multiple channels jointly. The distortion may be reweighted if the data are from different types of measurements (e.g., pressure and resistivity). The distortion may also re reweighted for data prioritization and/or when the user desires to improve the quality of one measurement but not others. A lower-bound rate for each channel may thus be defined, such that there are not missing blocks in the RT data.

The method 1700 may also include receiving, at the computer system 164 at the surface 102, the second block of data from the downhole tool 140 in the wellbore 130, as at 1708. The second block of data represents a second measurement captured by the downhole tool 140 during a second period of time. The second measurement may be the same as the first measurement (e.g., the same physical property), or the second measurement may be different. The second block of data is transmitted by the downhole tool 140 to the receiver (e.g., sensors 160, 162) while the downhole tool 140 is in the wellbore 130. The second measurement may represent formation properties, physical properties, or the like. The second period of time may be directly after the first period of time, or additional blocks of data corresponding to additional periods of time may be positioned between the first and second blocks of data.

The method 1700 may also include performing a drilling action using the first measurement in the updated first block of data, as at 1710. The drilling action may include varying a trajectory of the downhole tool 140 to vary a trajectory of the wellbore 130. In another embodiment, the drilling action may include varying a weight-on-bit ("WOB") of the downhole tool 140 at one or more locations in the subterranean formation 132. In another embodiment, the drilling action may include varying a flow rate of fluid being pumped into the wellbore 130. In another embodiment, the drilling action may include varying a type (e.g., composition) of the fluid being pumped into the wellbore 130. In another embodiment, the drilling action may include measuring one or more additional properties in the subterranean formation 132 using the downhole tool 140. In another embodiment, the updated first block of data may be used for data interpretation.

Figure 18:
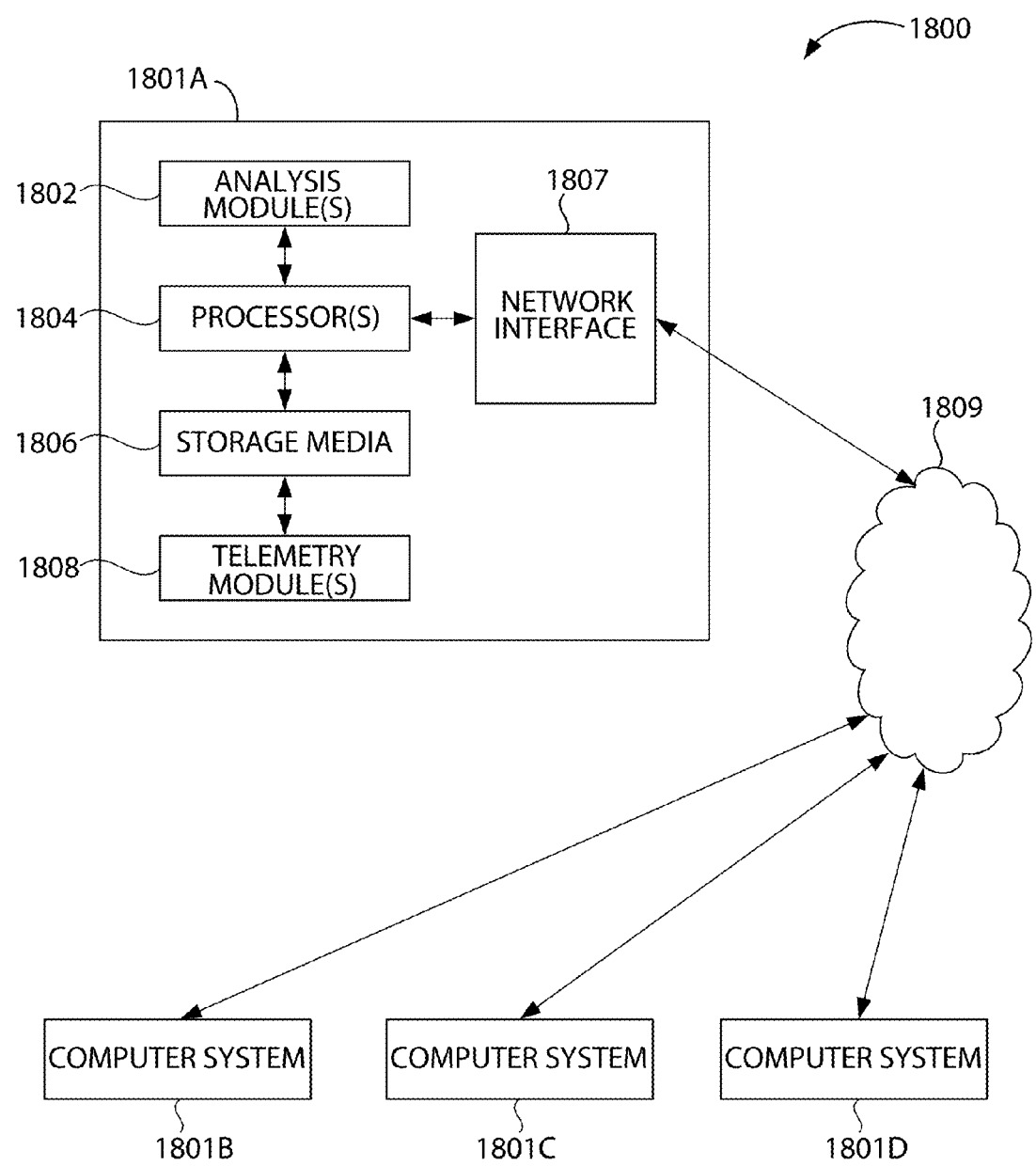
FIG. 18 illustrates a schematic view of a computing system for performing at least a portion of the methods, according to an embodiment.

In some embodiments, the methods of the present disclosure may be executed by a computing system. FIG. 18 illustrates an example of such a computing system 1800, in accordance with some embodiments. The computing system 1800 may be positioned at the surface 102 or in the wellbore 130 (e.g., part of the downhole tool 140). The computing system 1800 may include a computer or computer system 1801A, which may be an individual computer system 1801A or an arrangement of distributed computer systems. The computer system 1801A includes one or more analysis modules 1802 that are configured to perform various tasks according to some embodiments, such as one or more methods disclosed herein. To perform these various tasks, the analysis module 1802 executes independently, or in coordination with, one or more processors 1804, which is (or are) connected to one or more storage media 1806. The processor(s) 1804 is (or are) also connected to a network interface 1807 to allow the computer system 1801A to communicate over a data network 1809 with one or more additional computer systems and/or computing systems, such as 1801B, 1801C, and/or 1801D (note that computer systems 1801B, 1801C and/or 1801D may or may not share the same architecture as computer system 1801A, and may be located in different physical locations, e.g., computer systems 1801A and 1801B may be located in a processing facility, while in communication with one or more computer systems such as 1801C and/or 1801D that are located in one or more data centers, and/or located in varying countries on different continents).

A processor may include a microprocessor, microcontroller, processor module or subsystem, programmable integrated circuit, programmable gate array, or another control or computing device.

The storage media 1806 may be implemented as one or more computer-readable or machine-readable storage media. Note that while in the example embodiment of FIG. 18 storage media 1806 is depicted as within computer system 1801A, in some embodiments, storage media 1806 may be distributed within and/or across multiple internal and/or external enclosures of computing system 1801A and/or additional computing systems. Storage media 1806 may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices. Note that the instructions discussed above may be provided on one computer-readable or machine-readable storage medium, or may be provided on multiple computer-readable or machine-readable storage media distributed in a large system having possibly plural nodes. Such computer-readable or machine-readable storage medium or media is (are) considered to be part of an article (or article of manufacture). An article or article of manufacture may refer to any manufactured single component or multiple components.

The storage medium or media may be located either in the machine running the machine-readable instructions, or located at a remote site from which machine-readable instructions may be downloaded over a network for execution.

In some embodiments, the computing system 1800 contains one or more telemetry module(s) 1808. The telemetry module(s) 1808 may be used to perform at least a portion of one or more embodiments of the methods disclosed herein (e.g., method 1700).

It should be appreciated that computing system 1800 is one example of a computing system, and that computing system 1800 may have more or fewer components than shown, may combine additional components not depicted in the example embodiment of FIG. 18, and/or computing system 1800 may have a different configuration or arrangement of the components depicted in FIG. 18. The various components shown in FIG. 18 may be implemented in hardware, software, or a combination of both hardware and software, including one or more signal processing and/or application specific integrated circuits.

Further, the methods described herein may be implemented by running one or more functional modules in information processing apparatus such as general purpose processors or application specific chips, such as ASICs, FPGAs, PLDs, or other appropriate devices. These modules, combinations of these modules, and/or their combination with general hardware are included within the scope of protection of the disclosure.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. Moreover, the order in which the features of the methods described herein are illustrate and described may be re-arranged, and/or two or more elements may occur simultaneously. The embodiments were chosen and described in order to best explain the principals of the disclosure and its practical applications, to thereby enable others skilled in the art to best utilize the disclosure and various embodiments with various modifications as are suited to the particular use contemplated.

What is claimed is:

1. A method for improving a quality of data received from a downhole tool in a wellbore, comprising:
   receiving a first block of data from the downhole tool in the wellbore, wherein the first block of data represents a first measurement captured by the downhole tool during a first period of time;
   determining that at least a portion of the first block of data is corrupted;
   in response to determining that said at least a portion of the first block of data is corrupted, transmitting a command to the downhole tool in the wellbore instructing the downhole tool to allocate at least a portion of a bit budget for a second block of data to the first block of data to produce an updated first block of data, wherein the portion of the bit budget for the second block of data that is allocated to the first block of data is used to re-transmit the portion of the first block of data that was corrupted; and
   receiving the second block of data from the downhole tool in the wellbore, wherein the second block of data represents a second measurement captured by the downhole tool during a second period of time.

2. The method of claim 1, wherein the portion of the bit budget for the second block of data that is allocated to the first block of data is used to improve a quality of the first measurement.

3. The method of claim 1, wherein the first measurement from the first block of data and the second measurement from the second block of data are compressed using a progressive compression algorithm to produce a first compressed bit stream and a second compressed bit stream.

4. The method of claim 3, wherein the first compressed bit stream and the second compressed bit stream are stored in a memory of the downhole tool.

5. The method of claim 4, wherein additional bits to improve a quality of the first measurement are retrieved from the first compressed bit stream in the memory of the downhole tool, and wherein the method further comprises receiving the additional bits from the downhole tool.

6. The method of claim 1, wherein the allocating the portion of the bit budget for the second block of data comprises optimizing a reconstruction quality of the first block of data and the second block of data.

7. The method of claim 1, wherein a size of the portion of the bit budget that is allocated to produce the updated first block of data is selected in response to data features present in the first block of data and data features present in the second block of data.

8. The method of claim 1, wherein a size of the portion of the bit budget that is allocated to produce the updated first block of data is determined in response to a quality of the first measurement in the first block of data and a quality of the second measurement in the second block of data.

9. The method of claim 1, wherein a size of the portion of the bit budget that is allocated to produce the updated first block of data is determined in response to an estimate of a signal-to-noise ratio of a channel through which the first and second blocks of data are transmitted.

10. The method of claim 1, wherein the first measurement comprises a different property than the second measurement.

11. The method of claim 1, wherein the first measurement from the first block of data and the second measurement from the second block are obtained from different sensors in the downhole tool.

12. The method of claim 11, wherein a size of the portion of the bit budget that is allocated to produce the updated first block of data is determined in response to reweighting a quality metric of the first block of data and reweighting a quality metric of the second block of data to model a priority of each of the first and second blocks of data.

13. The method of claim 1, further comprising performing a drilling action in response to the updated first block of data.

14. The method of claim 1, wherein the first block of data occurs when the downhole tool is drilling, and wherein the second block of data occurs when the downhole tool is not drilling.

15. The method of claim 1, further comprising performing a drilling action in response to the updated first block of data, wherein the drilling action comprises varying a trajectory of the downhole tool, varying a weight-on-bit of the downhole tool, varying a flow rate of a fluid being pumped into the wellbore, varying a composition of the fluid being pumped into the wellbore, measuring one or more additional properties in a subterranean formation using the downhole tool, or a combination thereof.

* * * * *